(12) United States Patent
Okumoto et al.

(10) Patent No.: US 10,527,153 B2
(45) Date of Patent: Jan. 7, 2020

(54) VEHICLE DIFFERENTIAL DEVICE

(71) Applicant: TOYOTA JIDOSHA KABUSHIKI KAISHA, Toyota-shi, Aichi (JP)

(72) Inventors: Kengo Okumoto, Seto (JP); Osamu Shimizu, Okazaki (JP); Takahide Kobayashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 15/997,210

(22) Filed: Jun. 4, 2018

(65) Prior Publication Data

US 2019/0003571 A1 Jan. 3, 2019

(30) Foreign Application Priority Data

Jun. 30, 2017 (JP) .................................. 2017-129944

(51) Int. Cl.
*F16H 48/40* (2012.01)
*F16H 57/04* (2010.01)
*F16H 48/08* (2006.01)

(52) U.S. Cl.
CPC ......... *F16H 57/0427* (2013.01); *F16H 48/40* (2013.01); *F16H 57/0471* (2013.01); *F16H 57/0483* (2013.01); *F16H 48/08* (2013.01)

(58) Field of Classification Search
CPC ............. F16H 57/0471; F16H 57/0483; F16H 57/0427

See application file for complete search history.

(56) References Cited

U.S. PATENT DOCUMENTS

| | | | | |
|---|---|---|---|---|
| 5,735,765 A | * | 4/1998 | Teraoka | F16H 48/285 475/160 |
| 5,890,984 A | * | 4/1999 | Teraoka | F16H 48/285 475/160 |
| 6,059,683 A | * | 5/2000 | Teraoka | F16H 48/285 475/160 |
| 2019/0170241 A1 | * | 6/2019 | Nakamura | F16H 57/0427 |

FOREIGN PATENT DOCUMENTS

| | | |
|---|---|---|
| JP | H08-247261 A | 9/1996 |
| JP | 2002-147442 A | 5/2002 |

* cited by examiner

*Primary Examiner* — Derek D Knight
(74) *Attorney, Agent, or Firm* — Oliff PLC

(57) ABSTRACT

A vehicle differential device includes: a differential casing having a pair of axle supporting holes; a pinion gear; a pair of side gears; and a pair of washers each interposed between a contact surface of the differential casing and a back surface of each side gear. The differential casing defines first lubrication grooves provided in an inner circumferential surface of each axle supporting hole, and second lubrication grooves and third lubrication grooves provided in the contact surface. Each second lubrication groove communicates at its end with the corresponding first lubrication groove, and communicates at another end with a space. Each third lubrication groove communicates at its end with the corresponding first lubrication groove, and is closed at another end, without the third lubrication groove being in communication with the space.

7 Claims, 6 Drawing Sheets

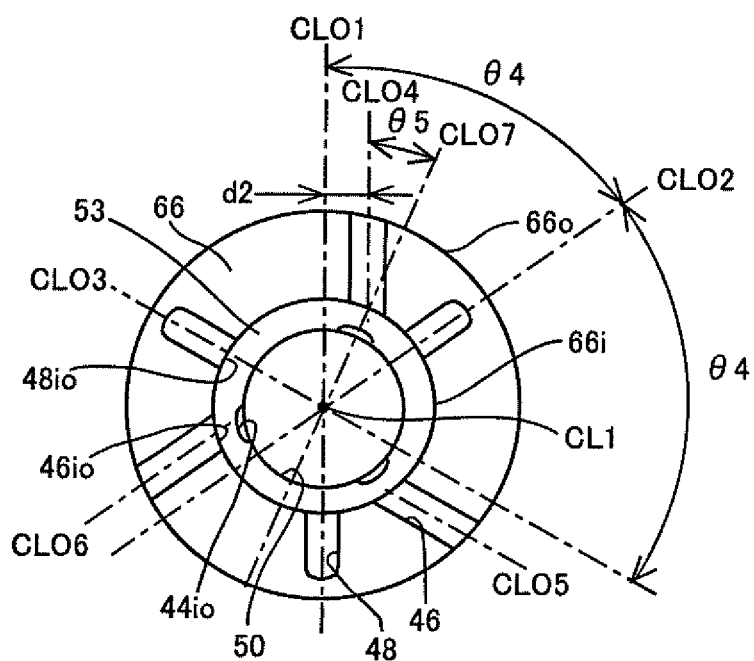
FIG.9  B-B

VEHICLE DIFFERENTIAL DEVICE

This application claims priority from Japanese Patent Application No. 2017-129944 filed on Jun. 30, 2017, the disclosure of which is herein incorporated by reference in its entirety.

FIELD OF THE INVENTION

The present invention relates in general to a vehicle differential device, and more particularly to a technique to lubricate a washer interposed between a differential casing and each side gear that is disposed within the differential casing.

BACKGROUND OF THE INVENTION

When a vehicle turns a corner, an inner drive wheel and an outer drive wheel of the vehicle have to be allowed to be rotated at respective different rotational speeds. The vehicle is provided with a differential device including: a differential casing; a pinion gear which is fixed to a final gear and which is rotatably held in the differential casing; and a pair of side gears which mesh with the pinion gear and which are connected to respective axles each transmitting a drive force to a corresponding one of the drive wheels, so that, upon turning of the vehicle, the differential device is configured to distribute the drive force to the axles corresponding to the right and left drive wheels while allowing a difference between the rotational speeds of the respective axles.

In the above-described differential device, during straight running of the vehicle, there is no difference between rotational speeds of the pair of side gears, namely, a differential rotation is not caused. That is, during the straight running, the pinion gear is not rotated about its axis (although the pinion gear is revolved about axes of the axles together with rotation of the differential casing), and each of the side gears and the differential casing are not rotated relative to each other, without difference of the rotational speed therebetween. However, when the vehicle turns a corner, a resistance applied to one of the side gears that drives the vehicle through the inner drive wheel is made larger than a resistance applied to the other of the side gears that drives the vehicle through the outer drive wheel, whereby a rotational speed of the above-described one of the side gears is relatively reduced while a rotational speed of the above-described other of the side gears is relatively increased. This differential rotation of the side gears causes the pinion gear to be rotated about its axis, and causes the rotational speed difference between each of the side gears and the differential casing. The rotational speed difference could cause wears of the washer (interposed between each side gear and the differential casing), each side gear and the differential casing. For reducing the wears of the washer, side gear and differential casing, there is known an arrangement in which the washer is given an improved wear resistance, for example, by providing a surface of the washer with a surface treatment or a coating that improves the wear resistance. JP-H08-247261A discloses an arrangement for reducing the wears by lubricant supplied to a lubricant passage that is provided in a contact surface of the differential casing which is contact with the washer interposed between the differential casing and each side gear, such that the lubricant passage radially passes through portions of the differential casing that are opposed to respective outer and inner peripheries of the washer.

SUMMARY OF THE INVENTION

However, in the above-described known arrangement in which the surface treatment is provided on the washer, there is a risk that the cost for the surface treatment could be expensive if the performance of the wear resistance is intended to be increased sufficiently. Further, in the above-described disclosed arrangement in which the contract surface of the differential casing is provided with the lubricant passage for introducing the lubricant onto the contact surface for reducing the wears, namely, in which the lubricant passage is provided to pass through the portions opposed to respective outer and inner peripheries of the washer so as to be in communication with a radial outside of the washer, there is a risk that a sufficient amount of lubricant required for the contact surface could not be retained in the lubricant passage.

The present invention was made in view of the background art described above. It is therefore an object of the present invention to provide a differential device in which a lubricant is sufficiently supplied between a differential casing and a washer that is in contact with the differential casing, for reducing wears of contact surface of the differential casing and the washer, without requiring an expensive surface treatment.

The object indicated above is achieved according to the following modes of the present invention.

According to a first mode of the invention, there is provided a vehicle differential device including: (a) a differential casing having a pair of axle supporting holes in which a pair of axles of the vehicle are rotatably supported; (b) a pinion gear rotatably supported in the differential casing; (c) a pair of side gears which mesh with the pinion gear and which are connected to the respective axles of the vehicle; and (d) a pair of washers each of which is interposed between the differential casing and a back surface of a corresponding one of the pair of side gears, and each of which is in contact with a corresponding one of a pair of contact surfaces of the differential casing. The differential casing defines at least one first lubrication groove, at least one second lubrication groove and at least one third lubrication groove. Each of the at least one first lubrication groove is provided in an inner circumferential surface of a corresponding one of the pair of axle supporting holes, and extends in a direction including a component of an axial direction of the corresponding one of the pair of axle supporting holes. Each of the at least one second lubrication groove and each of the at least one third lubrication groove are provided in a corresponding one of the pair of contact surfaces of the differential casing. Each of the at least one second lubrication groove communicates at one of opposite ends thereof with a corresponding one of the at least one first lubrication groove through a connecting passage, and communicates at the other of the opposite ends thereof with a space located radially outside a corresponding one of the pair of side gears. Each of the at least one third lubrication groove communicates at one of opposite ends thereof with a corresponding one of the at least one first lubrication groove through the connecting passage, and is closed at the other of the opposite ends thereof, without the each of the at least one third lubrication groove being in communication with the space. It is preferable that each of the at least one first lubrication groove is a helical groove extending in a helical direction as the direction including the component of the axial direction. Further, it is preferable that (i) the at least one first lubrication groove, which is provided in the inner circumferential surface of each of the pair of axle supporting holes, consists of a plurality of first lubrication grooves, that (ii) the at least one second lubrication groove, which is provided in a corresponding one of the pair of contact surfaces of the differential casing, consists of a plurality of second lubrication grooves, that (iii) the at least one third lubrication groove, which is provided in the corresponding one of the pair of contact surfaces of the differential casing, consists of a plurality of third lubrication grooves, and that (iv) the plurality of first lubrication grooves, the plurality of second lubrication grooves and the plurality of third lubrication grooves communicate with one another through the connecting passage.

According to a second mode of the invention, in the vehicle differential device according to the first mode of the invention, the number of the at least one first lubrication groove provided in the inner circumferential surface of each of the pair of axle supporting holes is equal to the number of the at least one second lubrication groove provided in a corresponding one of the pair of contact surfaces of the differential casing.

According to a third mode of the invention, in the vehicle differential device according to the first or second mode of the invention, the at least one second lubrication groove provided in each of the pair of contact surfaces of the differential casing consists of a plurality of second lubrication grooves, such that the plurality of second lubrication grooves extend from the connecting passage radially outwardly toward the space, and such that the number of the plurality of second lubrication grooves is an even number, the at least one third lubrication groove provided in the each of the pair of contact surfaces of the differential casing consists of a plurality of third lubrication grooves, such that the plurality of third lubrication grooves extend from the connecting passage radially outwardly toward the space, and such that the number of the plurality of third lubrication grooves is an even number and is equal to the number of the plurality of second lubrication grooves, each of the plurality of second lubrication grooves has a radially inner opening as the one of the opposite ends of the each of the plurality of second lubrication grooves, and each of the plurality of third lubrication grooves has a radially inner opening as the one of the opposite ends of each of the plurality of third lubrication grooves, the radially inner opening of one of the plurality of second lubrication grooves and the radially inner opening of another of the plurality of second lubrication grooves are opposed to each other in a diametrical direction of a corresponding one of the pair of axle supporting holes, and the radially inner opening of one of the plurality of third lubrication grooves and the radially inner opening of another of the plurality of third lubrication grooves are opposed to each other in the diametrical direction.

According to a fourth mode of the invention, in the vehicle differential device according to the first or second mode of the invention, the at least one second lubrication groove and the at least one third lubrication groove extend from the connecting passage radially outwardly toward the space, the number of the at least one second lubrication groove provided in each of the pair of contact surfaces of the differential casing is an odd number, the number of the at least one third lubrication groove provided in the each of the pair of contact surfaces of the differential casing is an odd number, and is equal to the number of the at least one second lubrication groove, each of the at least one second lubrication groove has a radially inner opening as the one of the opposite ends of the each of the at least one second lubrication groove, and each of the at least one third lubrication groove has a radially inner opening as the one of the opposite ends of each of the at least one third lubrication groove, and the radially inner opening of each of the at least one second lubrication groove and the radially inner opening of a corresponding one of the third lubrication groove are opposed to each other in a diametrical direction of a corresponding one of the pair of axle supporting holes.

According to a fifth mode of the invention, in the vehicle differential device according to any one of the first through fourth modes of the invention, each of the at least one second lubrication groove extends from the connecting passage radially outwardly toward the space, and has a radially inner opening as the one of the opposite ends of the each of the at least one second lubrication groove, each of the at least one first lubrication groove, which is provided in the inner circumferential surface of the corresponding one of the p it of axle supporting holes, has an opening, such that the each of the at least one first lubrication groove communicates at the opening thereof with the connecting passage, and the opening of each of the at least one first lubrication groove overlaps with the radially inner opening of a corresponding one of the at least one second lubrication groove in a radial direction of a corresponding one of the pair of axle supporting holes.

According to the first mode of the invention, the vehicle differential device includes: (a) a differential casing having a pair of axle supporting holes in which a pair of axles of the vehicle are rotatably supported; (b) a pinion gear rotatably supported in the differential casing; (c) a pair of side gears which mesh with the pinion gear and which are connected to the respective axles of the vehicle; and (d) a pair of washers each of which is interposed between the differential casing and a back surface of a corresponding one of the pair of side gears, and each of which is in contact with a corresponding one of a pair of contact surfaces of the differential casing. The differential casing defines at least one first lubrication groove, at least one second lubrication groove and at least one third lubrication groove. Each of the at least one first lubrication groove is provided in an inner circumferential surface of a corresponding one of the pair of axle supporting holes, and extends in a direction including a component of an axial direction of the corresponding one of the pair of axle supporting holes. Each of the at least one second lubrication groove and each of the at least one third lubrication groove are provided in a corresponding one of the pair of contact surfaces of the differential casing. Each of the at least one second lubrication groove communicates at one of opposite ends thereof with a corresponding one of the at least one first lubrication groove through a connecting passage, and communicates at the other of the opposite ends thereof with a space located radially outside a corresponding one of the pair of side gears. Each of the at least one third lubrication groove communicates at one of opposite ends thereof with a corresponding one of the at least one first lubrication groove through the connecting passage, and is closed at the other of the opposite ends thereof, without the each of the at least one third lubrication groove being in communication with the space. Owing to this arrangement, the lubricant flowing from the at least one first lubrication groove can be retained on the contact surfaces of the differential casing, thereby making it possible to easily reduce the wears of the differential casing and the washers.

According to the second mode of the invention, the number of the at least one first lubrication groove provided in the inner circumferential surface of each of the pair of axle supporting holes is equal to the number of the at least one second lubrication groove provided in a corresponding one of the pair of contact surfaces of the differential casing.

Owing to this arrangement, the lubricant is retained in the third lubrication groove, and a sufficient amount of lubricant is circulated through inside and outside of the differential casing via the first and second lubrication grooves, so as to be supplied onto surfaces of the washers, thereby making it possible to easily reduce the wears of the differential casing and the washers.

According to the third mode of the invention, the at least one second lubrication groove provided in each of the pair of contact surfaces of the differential casing consists of a plurality of second lubrication grooves, such that the plurality of second lubrication grooves extend from the connecting passage radially outwardly toward the space, and such that the number of the plurality of second lubrication grooves is an even number, the at least one third lubrication groove provided in the each of the pair of contact surfaces of the differential casing consists of a plurality of third lubrication grooves, such that the plurality of third lubrication grooves extend from the connecting passage radially outwardly toward the space, and such that the number of the plurality of third lubrication grooves is an even number and is equal to the number of the plurality of second lubrication grooves, each of the plurality of second lubrication grooves has a radially inner opening as the one of the opposite ends of the each of the plurality of second lubrication grooves, and each of the plurality of third lubrication grooves has a radially inner opening as the one of the opposite ends of each of the plurality of third lubrication grooves, the radially inner opening of one of the plurality of second lubrication grooves and the radially inner opening of another of the plurality of second lubrication grooves are opposed to each other in a diametrical direction of a corresponding one of the pair of axle supporting holes, and the radially inner opening of one of the plurality of third lubrication grooves and the radially inner opening of another of the plurality of third lubrication grooves are opposed to each other in the diametrical direction. Owing to this arrangement, a sufficient amount of lubricant can be retained on the contact surfaces of the differential casing that are in contact with the respective washers, and an entirety of each contact surface can be lubricated by a more even amount of lubricant, whereby the wears of the differential casing and the washers can be easily reduced.

According to the fourth mode of the invention, the at least one second lubrication groove and the at least one third lubrication groove extend from the connecting passage radially outwardly toward the space, the number of the at least one second lubrication groove provided in each of the pair of contact surfaces of the differential casing is an odd number, the number of the at least one third lubrication groove provided in the each of the pair of contact surfaces of the differential casing is an odd number, and is equal to the number of the at least one second lubrication groove, each of the at least one second lubrication groove has a radially inner opening as the one of the opposite ends of the each of the at least one second lubrication groove, and each of the at least one third lubrication groove has a radially inner opening as the one of the opposite ends of each of the at least one third lubrication groove, and the radially inner opening of each of the at least one second lubrication groove and the radially inner opening of a corresponding one of the third lubrication groove are opposed to each other in a diametrical direction of a corresponding one of the pair of axle supporting holes. Owing to this arrangement, a sufficient amount of lubricant can be retained on the contact surfaces of the differential casing that are in contact with the respective washers, and an entirety of each contact surface can be lubricated by a more even amount of lubricant, whereby the wears of the differential casing and the washers can be easily reduced.

According to the fifth mode of the invention, each of the at least one second lubrication groove extends from the connecting passage radially outwardly toward the space, and has a radially inner opening as the one of the opposite ends of the each of the at least one second lubrication groove, each of the at least one first lubrication groove, which is provided in the inner circumferential surface of the corresponding one of the pair of axle supporting holes, has an opening, such that the each of the at least one first lubrication groove communicates at the opening thereof with the connecting passage, and the opening of each of the at least one first lubrication groove overlaps with the radially inner opening of a corresponding one of the at least one second lubrication groove in a radial direction of a corresponding one of the pair of axle supporting holes. Owing to this arrangement, the lubricant is retained in the third lubrication groove while being efficiently delivered from the first lubrication groove to the second lubrication groove, and an increased amount of lubricant is circulated through inside and outside of the differential casing via the first and second lubrication grooves, so as to be supplied onto surfaces of the washers, thereby making it possible to more easily reduce the wears of the differential casing and the washers.

BRIEF DESCRIPTION OF THE DRAWINGS

FIG. 9 is a view of a left-side contact surface of the differential casing in a fifth embodiment of the invention, as seen in the direction indicated by arrows B in FIG. 2, and the view shows that three second lubrication grooves and three third lubrication grooves are provided in the left-side contact surface and that a widthwise centerline of each of the three second lubrication grooves is distant, by a predetermined distance d2, from a straight line which passes the axis of the axle supporting hole and which is parallel with the widthwise center line.

DETAILED DESCRIPTION OF PREFERRED EMBODIMENTS

Hereinafter, some embodiments of the invention will be described in detail with reference to the accompanying drawings. The figures of the drawings are simplified or deformed as needed, and each portion is not necessarily precisely depicted in terms of dimension ratio, shape, etc.

First Embodiment

Figure 1:
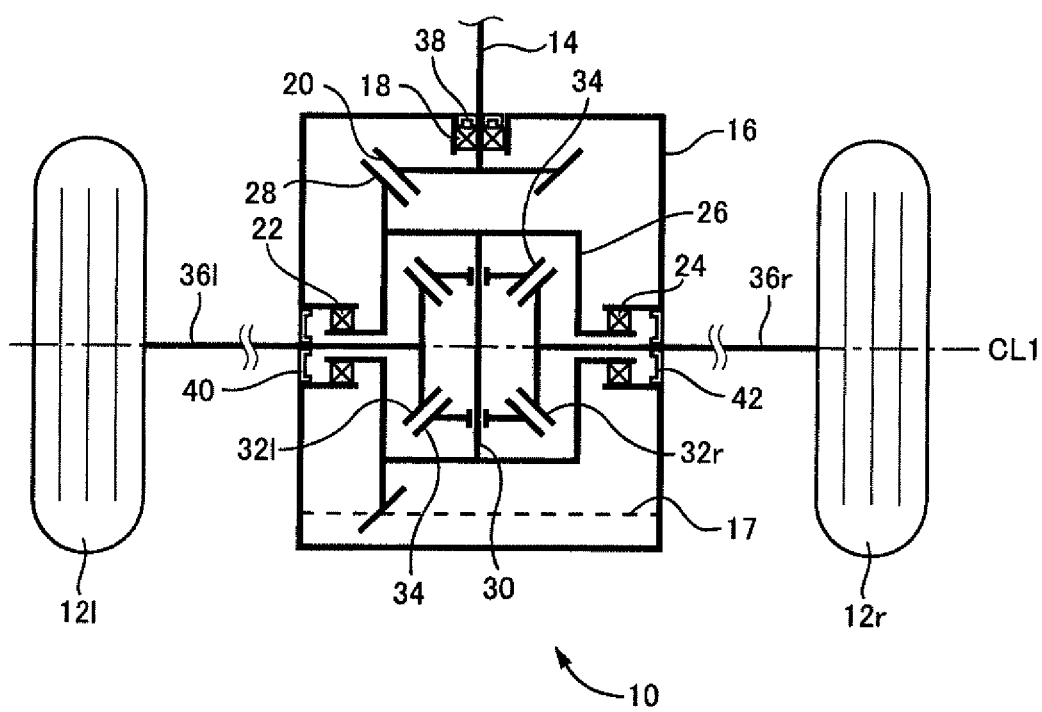
FIG. 1 is a view schematically showing a construction of a differential device to which the present invention is applied.

FIG. 1 is a view schematically showing a construction of a vehicle differential device 10 to which the present invention is applied. The differential device 10 shown in FIG. 1 is, for example, a differential gear device which is provided for left and right rear wheels 12*l*, 12*r* as drive wheels of a vehicle, and which distributes a drive force inputted through an input shaft (drive pinion shaft) 14, to the pair of rear wheels 12*l*, 12*r*, while allowing the rear wheels 12*l*, 12*r* to be rotated at respective different rotational speeds. The input shaft 14 is connected to, for example, an end portion of a propeller shaft via a universal joint, so that the drive force outputted from a drive force source (not shown) is transmitted to the input shaft 14 via power transmitting elements such as a transmission and the propeller shaft. It is noted that, although the drive wheels are the rear wheels 12 in the present embodiment, the invention is applicable also to a vehicle in which the drive wheels are front wheels.

The differential device 10 includes an input shaft 14, a housing (casing) 16, a small-diameter bevel gear 20, a differential casing 26, a large-diameter bevel gear 28, a pinion shaft 30, a pair of side gears 32*l*, 32*r* and a pair of pinion gears 34. The input shaft 14, small-diameter bevel gear 20, differential casing 26, large-diameter bevel gear 28, pinion shaft 30, side gears 32*l*, 32*r* and pinion gears 34 are provided in the housing 16 as a non-rotary member. The input shaft 14 is supported by the housing 16 through a bearing 18 such that the input shaft 14 is rotatable about its axis. The small-diameter bevel gear 20 is provided on one of axial end portions of the input shaft 14 which one is located inside the housing 16. The differential casing 26 is supported by the housing 16 via bearings 22, 24 such that the differential casing 26 is rotatable about a first axis CL1 that intersects perpendicularly with an extension of the input shaft 14. The first axis CL1 is an axis common to axles 36*l*, 36*r* (hereinafter referred simply to as "axles 36" where they are not particularly distinguished from each other) of the vehicle, which are rotatable about the first axis CL1. The large-diameter bevel gear 28 is fixed to the differential casing 26 so as to be rotatable together with the differential casing 26, and meshes with the small-diameter bevel gear 20. The pinion shaft 30 is fixed to the differential casing 26 through a knock pin 68 such that the pinion shaft 30 intersects perpendicularly with the first axis CL1. The pair of side gears 32*l*, 32*r* (hereinafter referred simply to as "side gears 32" where they are not particularly distinguished from each other) are bevel gears, and are supported by the differential casing 26 such that the side gears 32 are opposed to each other with the pinion shaft 30 being located between the side gears 32 in a direction of the first axis CL1 and are rotatable about their axes corresponding to the first axis CL1 relative to the differential casing 26. The pair of pinion gears 34 are bevel gears, and are mounted on the pinion shaft 30 such that the pinion gears 34 are rotatable about their axes relative to the pinion shaft 30 and such that each of the pinion gears 34 meshes with the side gears 32.

In the differential device 10, the side gear 32*l* is connected to the left axle 36*l* that drives the rear left wheel 12*l* while the side gear 32*r* is connected to the right axle 36*r* that drives the rear right wheel 12*r*. A lubricant is enclosed or stored in the housing 16, for lubricating elements of the differential device 10. The lubricant is prevented from leaking out of the housing 16, by sealing members such as an oil seal 38 disposed in a position which is near the bearing 18 and which is between the input shaft 14 and the housing 16, an oil seal 40 disposed in a position which is near the bearing 22 and which is between the axle 36*l* and the housing 16, and an oil seal 42 disposed in a position which is near the bearing 24 and which is between the axle 36*r* and the housing 16. A surface level 17 of the lubricant stored in a bottom portion of the housing 16 is indicated by broken line in FIG. 1. The stored lubricant is scraped up by rotation of the large-diameter bevel gear 28, so as to be supplied to the elements such as the axles 36, side gears 32 and pinion gears 34 within the housing 16. It is noted that, in the illustration of FIG. 1, the upper side of the first axis CL1 is a view as seen from an upper side of the vehicle while the lower side of the first axis CL1 is a view as seen from a rear side of the vehicle.

Figure 2:
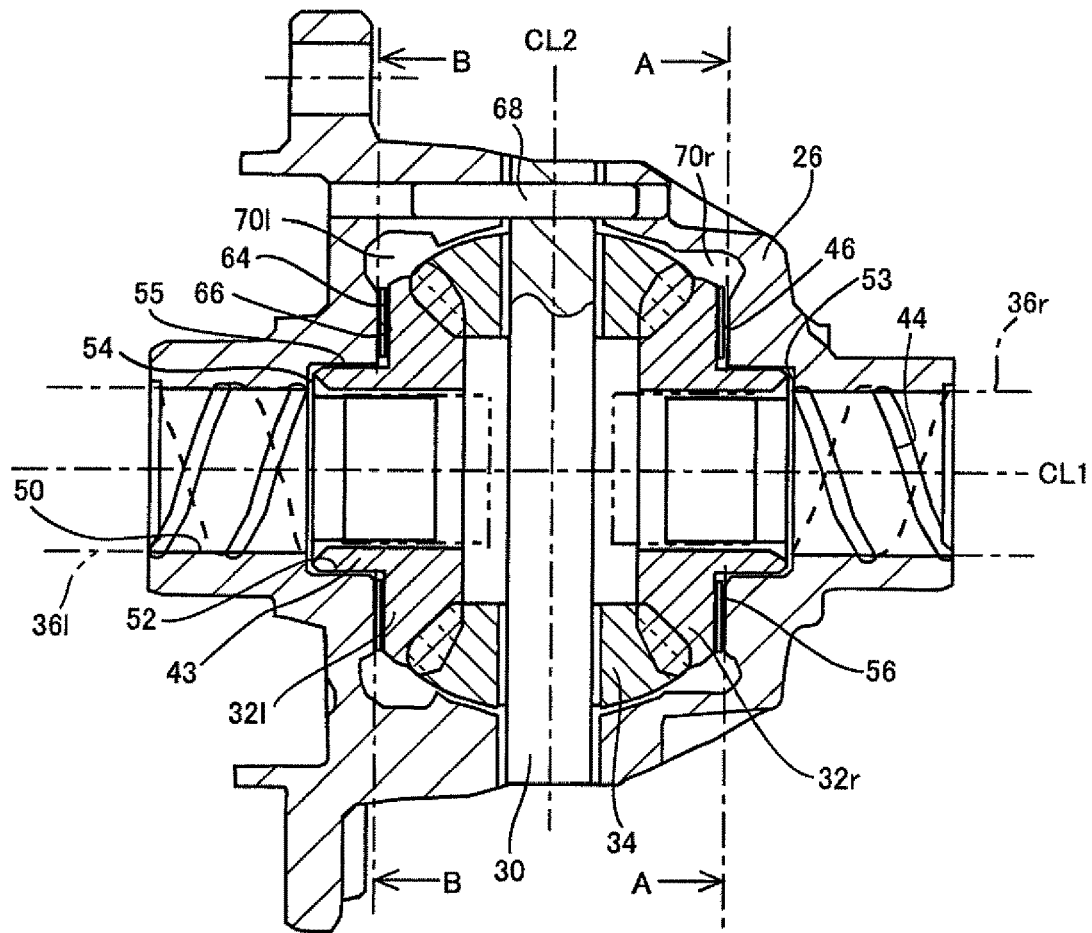
FIG. 2 is a view showing, by way of example, a differential casing of the differential device of FIG. 1.

FIG. 2 is a cross sectional view showing the differential casing 26 and elements disposed in the differential casing 26. The differential casing 26 is supported by the housing 16 through the bearings 22, 24 (that are shown in FIG. 1) such that the differential casing 26 is rotatable relative to the housing 16 about the first axis CL1 that is the axis common to the axles 36. The differential casing 26 has an axle supporting hole 50 that passes through the differential casing 26 in the direction of the first axis CL. The axles 36 are introduced and fitted in the axle supporting hole 50, and are rotatably held in the axle supporting hole 50. The pinion shaft 30 is fixed to the differential casing 26 through the knock pin 68, so as to be rotatable together with the differential casing 26 about the first axis CL1. The pair of pinion gears 34 are held by the pinion shaft 30 such that the pinion gears 34 are rotatable about a second axis CL2 that perpendicularly intersects with the first axis CL1. The pair of side gears 32*l*, 32*r* are rotatably held within the differential casing 26 such that the side gears 32*l*, 32*r* mesh with the pinion gears 34 and are opposed to each other in the direction of the first axis CL1. Each of the axles 36*l*, 36*r* is splined with an inner circumferential surface of a corresponding one of the side gears 32*l*, 32*r* such that each axle 36 is unrotatable relative to the corresponding side gear 32 and is axially movable relative to the corresponding side gear 32 in the direction of the first axis CL1. It is noted that the first axis CL1 of the axles 36*l*, 36*r* is coincident with an axis of the axle supporting hole 50. In this sense, the axis of the axle supporting hole 50 also will be referred to as the first axis CL1. It is further noted that each of the side gears 32 includes a large diameter portion and a small diameter portion coaxial with each other, wherein gear teeth are provided on a tapered portion of one of axially opposite end faces of the large diameter portion, which one is remote from the small diameter portion. The small diameter portion of the side gear 32 will be referred to as a boss portion 43, and the other of the axially opposite end faces of the large diameter portion of the side gear 32 will be referred to as a back surface 64.

During straight running of the vehicle, there is substantially no rotational difference between each of the side gears 32*l*, 32*r* and the differential casing 26, namely, there is substantially no sliding movement of the back surface 64 of each side gear 32 and a corresponding one of right-side and left-side contact surfaces 66 of the differential casing 26 (that are opposed to each other in the direction of the first axis CL1) relative to each other. However, when the vehicle turns on a corner during the running, the pinion gears 34 are rotated, and the side gears 32 are rotated at the respective different rotational speeds and accordingly a differential rotation of the side gears 32 is caused. Further, in this instance, due to the difference between the rotational speed of the differential casing 26 and the rotational speed of each of the side gears 32, the back surface 64 of each of the side gears 32 is caused to slide on a corresponding one of the contact surfaces (seating surfaces) 66 of the differential casing 26 on which a thrust force is exerted from the side gear 32.

Figure 3:
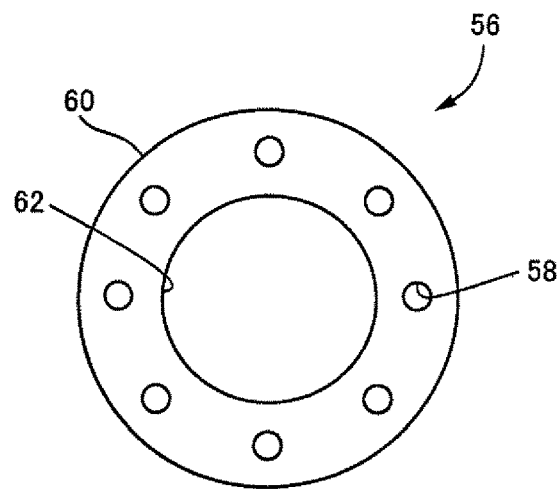
FIG. 3 is a view of a washer interposed between the differential casing and each side gear of FIG. 2, as seen from a direction of an axis of an axle.

FIG. 3 shows a thrust washer 56 which has a ring-disk shape and which is interposed between the back surface 64 of each of the side gears 32 and a corresponding one of the contact surfaces 66 of the differential casing 26. The washer 56 has a plurality of through-holes 58 which open in its opposite side surfaces and which are provided for the purpose of mainly enabling the lubricant to be supplied onto opposite side surfaces of the washer 56. In the present embodiment, the plurality of through-holes 58 consist of eight through-holes that are equi-angularly arranged in a circle about an axis of the washer 56, as shown in FIG. 3. The number of the through-holes 58 and the size of each through-hole 58 may be changed within a range that assures the above-described purpose. The provision of the through-holes 58 is not essential, and the through-holes 58 may not be provided if the lubricant is supplied sufficiently onto the opposite side surfaces of the washer 56 even without the through-holes 58. Further, for the purpose of improving the lubricity and/or wear resistance of the opposite side surfaces of the washer 56, a surface treatment using soft nitrided film or the like may be applied to the washer 56, or a coating made of wear resistant material or lubricating material may be provided to cover a part or entirety of the washer 56. The washer 56 has inside and outside diameters that are defined by its inner peripheral edge 62 and outer peripheral edge 60, respectively. The inside diameter of the washer 56 is slightly larger than an outside diameter of the boss portion 43 of the corresponding side gear 32, or slightly larger than an inside diameter of a corresponding one of boss-portion fitting holes 52 of the differential casing 26, which has a diameter larger than a diameter of the axle supporting hole 50, for introducing therein the boss portion 43 fitted therein. The outside diameter of the washer 56 is slightly smaller than an outside diameter of the back surface 64 of the corresponding side gear 32. In this arrangement, the washer 56 is caused to slide relative to the back surface 64 of the corresponding side gear 32 and also relative to the corresponding contact surface 66 of the differential casing 26, wherein a wear amount resulting from the sliding movement of the washer 56 and the corresponding contact surface 66 of the differential casing 26 is larger than a wear amount resulting from the sliding movement of the washer 56 and the back surface 64 of the corresponding side gear 32, in case of absence of a lubricant supply arrangement according to the present invention. Further, it is estimated that, in a situation where the surfaces of the washer 56 are sufficiently lubricated, the rotational speed of the washer 56 is a value intermediate between the rotational speed of the back surface 64 of the corresponding side gear 32 and the rotational speed of the corresponding contact surface 66 of the differential casing 26.

The vehicle differential device 10 is provided with a lubricant circulation path, as shown in FIG. 2, for reducing wears of the above-described washer 56, side-gear back surface 64 and differential-casing contact surface 66. The lubricant is stored in the bottom portion of the housing 16 of the differential device 10, and is scraped up by rotation of the large-diameter bevel gear 28. The lubricant is retained also in first lubrication grooves 44 in the form of helical grooves that are provided in an inner circumferential surface of the axle supporting hole 50 in which the axles 36 are fitted. When a rotational speed difference is caused between each side gear 32 and the differential casing 26, for example, by turning of the vehicle on a corner, a rotational speed difference is caused also between the corresponding axle 36 (that is splined with the side gear 32 so as to be unrotatable relative to the side gear 32) and the differential casing 26. Owing the rotation of the axle 36 and the differential casing 26 relative to each other, the lubricant which is retained in the first lubrication grooves 44 (provided in the inner circumferential surface of the axle supporting hole 50) and which is in contact with the axle 36 rotated relative to the inner circumferential surface of the axle supporting hole 50, is dragged by an outer circumferential surface of the axle 36 so as to be displaced along the first lubrication grooves 44, so that the lubricant can be supplied toward inside the differential casing 26, depending on the direction of the relative rotation and the direction of the helix of each of the first lubrication grooves 44. Then, the lubricant is caused to pass through a predetermined first clearance 54, which is defined between a stepped surface 53 of the differential casing 26 and an axial end surface of the boss portion (axial portion) 43 of the side gear 32 in the direction of the first axis CL1, wherein the stepped surface 53 is a surface connecting between the inner circumferential surface of the axle supporting hole 50 and an inner circumferential surface of the boss-portion fitting hole 52. Then, the lubricant is caused to pass through a predetermined second clearance 55, which is defined between the inner circumferential surface of the boss-portion fitting hole 52 and an outer circumferential surface of the boss portion 43 of the side gear 32. After having passed through the first and second clearances 54, 55, the lubricant is caused, owing to a centrifugal force generated by rotation of the differential casing 26, to pass through second lubrication grooves 46 provided in the corresponding contact surface 66 of the differential casing 26, and is delivered to a corresponding one of annular-shaped spaces 70*l*, 70*r* (hereinafter referred simply to as "annular-shaped spaces side gears 70" where they are not particularly distinguished from each other) that are located radially outside the side gear 32. Eventually, the lubricant is returned to the bottom portion of the housing 16 via opening or openings (not shown) of the differential casing 26.

Figure 4:
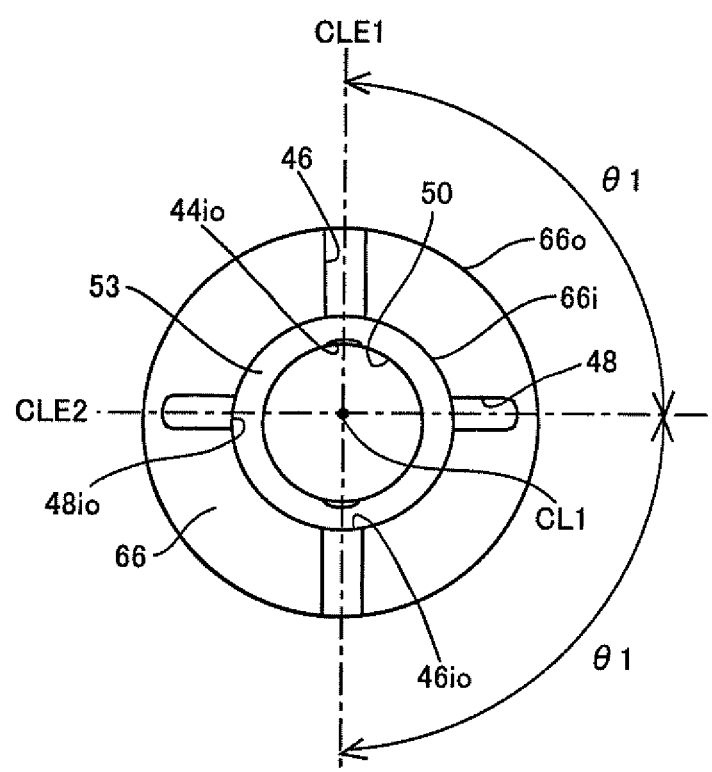
FIG. 4 is a view of a right-side contact surface or a left-side contact surface of the differential casing, which is in contact with the washer, in a first embodiment of the invention, as seen in a direction indicated by arrows A in FIG. 2 or a direction indicated by arrows B in FIG. 2, and the view shows that two second lubrication grooves and two third lubrication grooves are provided in each of the right-side contact surface and the left-side contact surface, and that the two second lubrication grooves are opposed to each other in a radial direction of an axle supporting hole and the two third lubrication grooves are opposed to each other in the radial direction.

The pair of circular-shaped contact surfaces 66 of the differential casing 26 are identical with each other in terms of shape that is shown in FIG. 4. That is, a view of the right-side contact surface 66 as seen in a direction indicated by arrows A in FIG. 2 and a view of the left-side contact surface 66 as seen in a direction indicated by arrows B in FIG. 2 are identical with each other. The two contact surfaces 66 are symmetrical with each other, with respect to either a center line which corresponds to the second axis CL2 or a center plane which contains the second axis CL2 and which is perpendicular to the first axis CL1. Each of the contact surfaces 66 is defined by an outer peripheral edge 66*o* as its outer peripheral end and an inner peripheral edge 66*i* as its inner peripheral end. Each of the contact surfaces 66 is provided with two second lubrication grooves 46 and two third lubrication grooves 48, for supplying the lubricant onto the washer 56. Each of the second lubrication grooves 46 is provided in the contact surface 66, such that a first center line CLE1 as its widthwise center line coincides with a straight line passing through the first axis CL1, and such that a widthwise center of a corresponding one of the first lubrication grooves 44 (that are provided in the inner circumferential surface of the axle supporting hole 50) coincides, at its side-gear side opening 44*io* (opening in the above-described stepped surface 53 that faces the above-described first clearance 54), with the first center line CLE1 in a circumferential direction about the first axis C1, as shown in FIG. 4. A radially inner opening 46*io* of each of the second lubrication grooves 46, which opens at the inner peripheral edge 66*i* of the contact surface 66, and the side-gear side opening 44*io* of a corresponding one of the first lubrication grooves 44, which opens in the stepped surface 53 facing the first clearance 54, and are located in the same position in the circumferential direction, and accordingly are distant from each other by a minimum distance. Therefore, the lubricant can flow smoothly from each of the first lubrication grooves 44 to a corresponding one of the second lubrication grooves 46 via the first and second clearances 54, 55. It is noted that a radially outer portion of the differential casing 26, which is located radially outside the contact surface 66, is not shown in FIG. 4.

As shown in FIG. 4, each of the third lubrication grooves 48 is provided in the contact surface 66, such that a second center line CLE2 as its widthwise center line coincides with a straight line passing through the first axis CL1 and cooperates with the above-described first center line CLE1 to define an angle θ1 that is a right angle, namely, such that each of the third lubrication grooves 48 is located in a position intermediate between the two adjacent second lubrication grooves 46 in the circumferential direction and is spaced apart from the two adjacent second lubrication grooves 46 by the same angular distance. Each of the third lubrication grooves 48 has a radially inner opening 48*io* that opens at the inner peripheral edge 66*i* of the contact surface 66. However, a radially outer end of each third lubrication groove 48 is closed without opening in the annular-shaped space 70 that is located radially outside the side gear 32. That is, each third lubrication groove 48 is a so-called "dead-end groove". Thus, irrespective of an amount of lubricant circulating via each second lubrication groove 46, a sufficient amount of lubricant can be retained in each third lubrication groove 48 having the closed radially outer end.

In the present embodiment, the differential device 10 includes: the differential casing 26 having the pair of axle supporting holes 50 in which the pair of axles 36 of the vehicle are rotatably supported; the pair of pinion gears 34 rotatably supported in the differential casing 26; the pair of side gears 32 which mesh with the pinion gear 34 and which are connected to the respective axles 36 of the vehicle; and the pair of washers 56 each of which is interposed between the differential casing 26 and the back surface 64 of a corresponding one of the pair of side gears 32, and each of which is in contact with a corresponding one of a pair of contact surfaces 66 of the differential casing 26. The differential casing 26 is provided with the first lubrication grooves 44, the second lubrication grooves 46 and the third lubrication grooves 48. Each of the first lubrication grooves 44 is provided in the inner circumferential surface of a corresponding one of the pair of axle supporting holes 50, and extends in a direction including a component of the axial direction of the corresponding one of the pair of axle supporting holes 50. Each of the second lubrication grooves 46 and each of the third lubrication grooves 48 are provided in a corresponding one of the pair of contact surfaces 66 of the differential casing 26. Each of the second lubrication grooves 46 communicates at one of opposite ends thereof with a corresponding one of the first lubrication grooves 44 through the connecting passage in the faun of the first and second clearances 54, 55, and communicates at the other of the opposite ends thereof with the space 70 located radially outside a corresponding one of the pair of side gears 32. Each of the third lubrication grooves 48 communicates at one of opposite ends thereof with a corresponding one of the first lubrication grooves 44 through the connecting passage in the form of the first and second clearances 54, 55, and is closed at the other of the opposite ends thereof, without the each of the third lubrication grooves 48 being in communication with the space 70. Owing to this arrangement, the lubricant flowing from the first lubrication grooves 44 can be retained on the contact surfaces 66 of the differential casing 26, thereby making it possible to easily reduce the wears of the differential casing 26 and the washers 56.

The number of the first lubrication grooves 44 provided in the inner circumferential surface of each one of the axle supporting holes 50 is equal to the number of the second lubrication grooves 46 provided in a corresponding one of the contact surfaces 66 of the differential casing 26. Owing to this arrangement, the lubricant is retained in the third lubrication grooves 48, and a sufficient amount of lubricant circulated through inside and outside of the differential casing 26 can be assured in any one of the first and second lubrication grooves 44, 46, so as to be supplied onto surfaces of the washers 56, thereby making it possible to easily reduce the wears of the differential casing 26 and the washers 56.

Each of the first and second lubrication grooves 46, 48 extends from the second clearance 55 that cooperates with the first clearance 54 to constitute the annular-shaped connecting passage, radially outwardly toward the space 70. The number of the first lubrication grooves 46 provided in each one of the right-side and left-side contact surfaces 66 and the number of the second lubrication grooves 48 provided in the same contact surface 66 are the same and both an even number that is two. Each of the two second lubrication grooves 46 has the radially inner opening 46*io* as the above-described one of the opposite ends thereof, and each of the two third lubrication grooves 48 has the radially inner opening 48*io* as the above-described one of the opposite ends thereof. The radially inner opening 46*io* of one of the two second lubrication grooves 46 and the radially inner opening 46*io* of another of the two second lubrication grooves 46 are opposed to each other in a diametrical direction of a corresponding one of the axle supporting holes 50. The radially inner opening 48*io* of one of the two third lubrication grooves 48 and the radially inner opening 48*io* of another of the two third lubrication grooves 48 are also opposed to each other in the diametrical direction. Owing to this arrangement, a sufficient amount of lubricant can be retained on the contact surfaces 66 of the differential casing 26 that are in contact with the respective washers 56, and an entirety of each contact surface 66 can be lubricated by a more even amount of lubricant, whereby the wears of the differential casing 26 and the washers 56 can be easily reduced.

The side-gear side opening 44*io* of each of the first lubrication grooves 44 overlaps with the radially inner opening 46*io* of a corresponding one of the second lubrication grooves 46 in a radial direction of a corresponding one of the axle supporting holes 50. Owing to this arrangement, the lubricant is retained in the third lubrication grooves 48 while being efficiently delivered from the first lubrication grooves 44 to the second lubrication grooves 46, and an increased amount of lubricant is circulated through inside and outside of the differential casing 26 via the first and second lubrication grooves 44, 46, so as to be supplied onto surfaces of the washers 56, thereby making it possible to more easily reduce the wears of the differential casing 26 and the washers 56.

There will be described another embodiment of this invention. The same reference signs as used in the above-described first embodiment will be used in the following embodiment, to identify the functionally corresponding elements, and descriptions thereof are not provided.

Second Embodiment

In the above-described first embodiment, the two second lubrication grooves 46 are provided in each of the two contact surfaces 66 of the differential casing 26 such that the first center line CLE1 as the widthwise center line of each of the two second lubrication grooves 46 coincides with the straight line passing through the first axis CL1. In this second embodiment, the two second lubrication grooves 46 are provided in each of the two contact surfaces 66 such that a third center line CLE3 as a widthwise center line of one of the two second lubrication grooves 46 and a fourth center line CLE4 as a widthwise center line of the other of the two second lubrication grooves 46 do not coincide with a straight line passing through the first axis CL1. Rather, each of the third center line CLE3 and the fourth center line CLE4 is deviated, by a predetermined distance d1, from the first center line CLE1 which is a straight line passing through the first axis CL1 and which is substantially parallel with the third and fourth center lines CLE3, CLE4.

Figure 5:
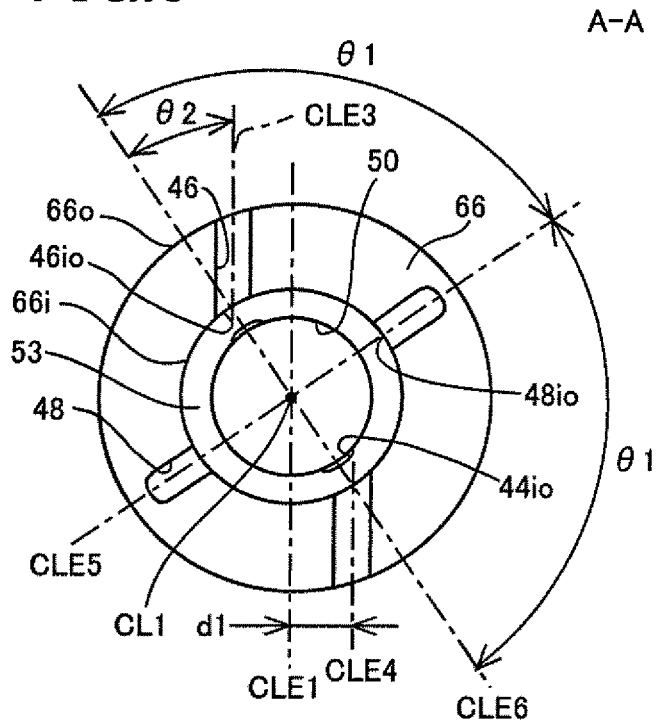
FIG. 5 is a view of a right-side contact surface of the differential casing, which is in contact with the washer, in a second embodiment of the invention, as seen in the direction indicated by arrows A in FIG. 2, and the view shows that two second lubrication grooves and two third lubrication grooves are provided in the right-side contact surface such that a widthwise center line of each of the two second lubrication grooves is distant, by a predetermine distance d1, from a straight line which passes an axis of the axle supporting hole and which is parallel with the widthwise center line.

FIG. 5 is a view of the right-side contact surface 66 of the differential casing 26 as seen in a direction indicated by arrows A in FIG. 2. The right-side contact surface 66 is provided with the two second lubrication grooves 46 and the two third lubrication grooves 48, for supplying the lubricant onto the washer 56. The radially inner opening 46*io* of each of the second lubrication grooves 46 and the side-gear side opening 44*io* of a corresponding one of the first lubrication grooves 44 are located in the same positon in the circumferential direction. That is, a center of the radially inner opening 46*io* and a center of the side-gear side opening 44*io* both lie on a plane containing the first axis CL1 and a sixth center line CLE6 that is a straight line passing through the first axis CL1. Therefore, the lubricant can flow smoothly from each of the first lubrication grooves 44 to a corresponding one of the second lubrication grooves 46 via the first and second clearances 54, 55. Each of the two third lubrication grooves 48 is provided in the right-side contact surface 66, such that a fifth center line CLE5 as its widthwise center line coincides with a straight line passing through the first axis CL1 and cooperates with the above-described sixth center line CLE6 to define an angle θ1 that is a right angle, namely, such that each of the third lubrication grooves 48 is located in a position intermediate between the radially inner openings 46*io* of the respective two adjacent second lubrication grooves 46 in the circumferential direction and between the side-gear side openings 44*io* of the respective two first lubrication grooves 44, and is spaced apart from the radially inner openings 46*io* and the side-gear side openings 44*io* by the same angular distance. The two second lubrication grooves 46 are provided in the right-side contact surface 66, such that each of the third center line CLE3 as the widthwise center line of one of the two second lubrication grooves 46 and the fourth center line CLE4 as the widthwise center line of the other of the two second lubrication grooves 46 is distant, by the predetermined distance d1, from the first center line CLE1 which is substantially parallel with the third and fourth center lines CLE3, CLE4 and which is contained in a plane containing the first axis CL1 and the second axis CL2 of the pinion shaft 30. A center of the side-gear side opening 44*io* of each of the first lubrication grooves 44 and a center of the radially inner opening 46*io* of a corresponding one of the second lubrication grooves 46 both lie on the plane containing the first axis CL1 and the sixth center line CLE6 which is a straight line passing through the first axis CL1 and which cooperates with each of the third center line CLE3 and the fourth center line CLE4 to define a predetermined angle θ2.

Figure 6:
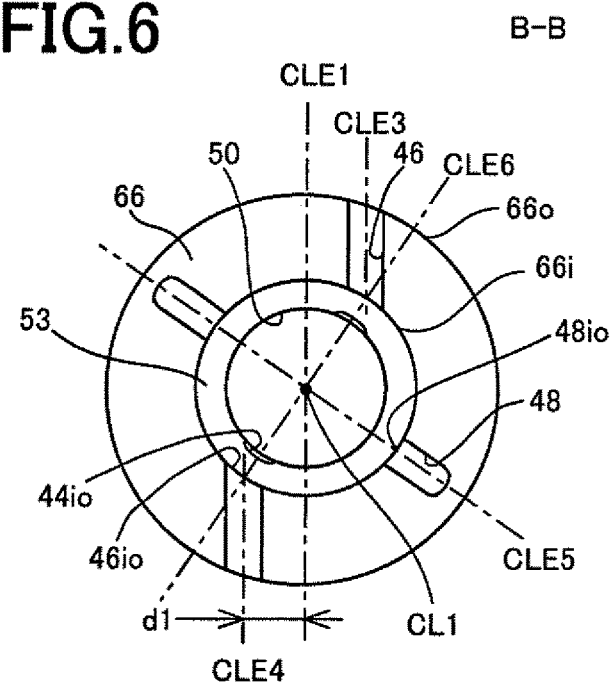
FIG. 6 is a view of a left-side contact surface of the differential casing, which is in contact with the washer, in the second embodiment, as seen in the direction indicated by arrows B in FIG. 2, and the view shows that two second lubrication grooves and two third lubrication grooves are provided in the left-side contact surface such that a widthwise center line of each of the two second lubrication grooves is distant, by a predetermined distance d1, from a straight line which passes the axis of the axle supporting hole and which is parallel with the widthwise center line.

FIG. 6 is a view of the left-side contact surface 66 of the differential casing 26 as seen in a direction indicated by arrows B in FIG. 2. The two second lubrication grooves 46 are provided in the left-side contact surface 66, such that each of the third center line CLE3 as the widthwise center line of one of the two second lubrication grooves 46 and the fourth center line CLE4 as the widthwise center line of the other of the two second lubrication grooves 46 is distant from, by the predetermined distance d1, the first center line CLE1 which is substantially parallel with the third and fourth center lines CLE3, CLE4 and which is contained in the plane containing the first axis CL1 and the second axis CL2 of the pinion shaft 30. Each of the two third lubrication grooves 48 is provided in the left-side contact surface 66, such that the fifth center line CLE5 as its widthwise center line coincides with the straight line passing through the first axis CL1 and cooperates with the sixth center line CLE6 to define the angle θ1 that is a right angle. The arrangement of the second and third lubrication grooves 46, 48 provided in the left-side contact surface 66 and the arrangement of the second and third lubrication grooves 46, 48 provided in the right-side contact surface 66 are symmetrical with respect to the center plane which contains the second axis CL2 and which is perpendicular to the first axis CL1. The second and third lubrication grooves 46, 48 provided in the left-side contact surface 66 shown in FIG. 6 and the second and third lubrication grooves 46, 48 provided in the right-side contact surface 66 shown in FIG. 5 are the same in terms of shape and function. The positions of the openings 44*io* of the respective two first lubrication grooves 44 opening in the (right-side) stepped surface 53 shown in FIG. 5 and the positions of the side-gear side openings 44*io* of each of the respective two first lubrication grooves 44 opening in the (left-side) stepped surface 53 shown in FIG. 6 are symmetrical with respect to the above-described center plane. The positions of the second and third lubrication grooves 46, 48 provided in the right-side contact surface 66 shown in FIG. 5 and the positions of the second and third lubrication grooves 46, 48 provided in the left-side contact surface 66 shown in FIG. 6 are symmetrical with respect to the above-described center plane. The same terms and reference signs are used to identify the functionally corresponding elements in FIGS. 5 and 6.

In this second embodiment, as in the above-described first embodiment, the wears of the differential casing 26 and the washers 56 can be easily reduced. Further, the arrangements of the second lubrication grooves 46 can be modified such that the widthwise center line of each of the second lubrication grooves 46 cooperates the sixth center line CLE6 passing through the first axis CL1 of the axle supporting hole 50, to define the predetermined angle θ2.

There will be described still another embodiment of this invention. The same reference signs as used in the above-described embodiments will be used in the following embodiment, to identify the functionally corresponding elements, and descriptions thereof are not provided.

Third Embodiment

In the above-described second embodiment, the fifth center line CLE5 as the widthwise center line of the third lubrication groove 48 cooperates with the sixth center line CLE6 that overlaps with the center of the side-gear side opening 44*io* of each first lubrication groove 44 and the center of the radially inner opening 46*io* of the corresponding second lubrication groove 46 in the direction of the first axis CL1, to define the right angle therebetween. In this third embodiment, as shown in FIG. 7, the two third lubrication grooves 48 are provided in each of the contact surfaces 66 of the differential casing 26 such that its widthwise center line is angularly shifted from the fifth center line CLE5 to the second center line CLE2, namely, such that its widthwise center line is angularly displaced about the first axis C1 by a predetermined angle, i.e., 45° (in counterclockwise direction as seen in FIG. 7) toward the six center line CLE6 that overlaps with the center of the side-gear side opening 44*io* of the first lubrication groove 44 and the center of the radially inner opening 46*io* of the second lubrication groove 46 in the direction of the first axis CL1.

Figure 7:
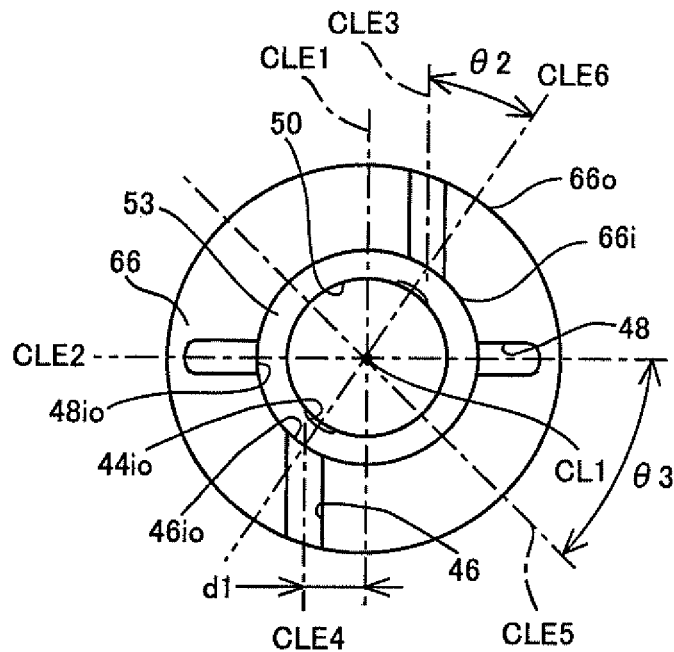
FIG. 7 is a view of a left-side contact surface of the differential casing in a third embodiment of the invention, as seen in the direction indicated by arrows B in FIG. 2, and the view shows that a widthwise center line of each of the two third lubrication grooves, which passes the axis, is angularly shifted by a predetermined angle θ3, as compared with the second embodiment shown in FIG. 6.

In this third embodiment, the positions of the side-gear side openings 44*io* of the respective two first lubrication grooves 44 opening in the (right-side) stepped surface 53 (not shown) and the positions of the side-gear side openings 44*io* of the respective two first lubrication grooves 44 opening in the (left-side) stepped surface 53 shown in FIG. 7 are symmetrical with respect to the center plane which contains the second axis CL2 and which is perpendicular to the first axis CL1. The positions of the second and third lubrication grooves 46, 48 provided in the right-side contact surface 66 (not shown) and the positions of the second and third lubrication grooves 46, 48 provided in the left-side contact surface 66 shown in FIG. 7 are symmetrical with respect to the above-described center plane. FIG. 7 is a view of the left-side contact surface 66 of the differential casing 26 as seen in the direction indicated by arrows B in FIG. 2.

Each of the right-side and left-side contact surfaces 66 is provided with the two second lubrication grooves 46 and the two third lubrication grooves 48, for supplying the lubricant onto the washer 56. The radially inner opening 46*io* of each of the second lubrication grooves 46 and the side-gear side opening 44*io* of a corresponding one of the first lubrication grooves 44 are located in the same positon in the circumferential direction. That is, a center of the radially inner opening 46*io* and a center of the side-gear side opening 44*io* both lie on the plane containing the first axis CL1 and the sixth center line CLE6 that is a straight line passing through the first axis CL1. Therefore, the lubricant can flow smoothly from each of the first lubrication grooves 44 to a corresponding one of the second lubrication grooves 46 via the first and second clearances 54, 55. The second center line CLE2 as the widthwise center line of each of the third lubrication grooves 48 coincides with a straight line passing through the first axis CL1. The first center line CLE1, which is parallel with the third and fourth center lines CLE3, CLE4 as the widthwise center lines of the respective two second lubrication grooves 46 and which passes through the first axis CL1, cooperates with the second center line CLE2 as the widthwise center line of each of the two third lubrication grooves 48, to define an right angle. Each of the third center line CLE3 and the fourth center line CLE4 as the widthwise center lines of the respective two second lubrication grooves 46 is distant from the first center line CLE1 which passes through the first axis CL1 (that is contained in the plane containing the second axis CL2 of the pinion shaft 30), by the predetermined distance d1. A center of the side-gear side opening 44*io* of each of the first lubrication grooves 44 and a center of the radially inner opening 46*io* of a corresponding one of the second lubrication grooves 46 both lie on the plane containing the first axis CL1 and the sixth center line CLE6 which is a straight line passing through the first axis CL1 and which cooperates with each of the third center line CLE3 and the fourth center line CLE4 to define a predetermined angle θ2.

In this third embodiment, as in the above-described first and second embodiments, the wears of the differential casing 26 and the washers 56 can be easily reduced. Further, the arrangements of the first and second lubrication grooves 44, 46 can be modified such that the center of the radially inner opening 46*io* of each of the first lubrication grooves 44 and the center of the radially inner opening 46*io* of a corresponding one of the second lubrication grooves 46 overlap with the sixth center line CLE6 (that cooperates with the first center line CLE1 to define the predetermined angle θ2) in the direction of the first axis CL1. Moreover, the arrangements of the third lubrication grooves 48 can be modified such that the widthwise center line of each of the third lubrication grooves 48 is located in a position that is closer to the above-described sixth center line CLE6 in the circumferential direction.

There will be described still another embodiment of this invention. The same reference signs as used in the above-described embodiments will be used in the following embodiment, to identify the functionally corresponding elements, and descriptions thereof are not provided.

Fourth Embodiment

In the above-described first through third embodiments, the number of the second lubrication grooves 46 provided in each of the right-side and left-side contact surfaces 66 of the differential casing 26 and the number of the third lubrication grooves 48 provided in the same contact surface 66 are both an even number, specifically, two. In this fourth embodiment, the number of the second lubrication grooves 46 provided in each of the contact surfaces 66 and the number of the third lubrication grooves 48 provided in the same contact surface 66 are both an odd number, for example, three.

Figure 8:
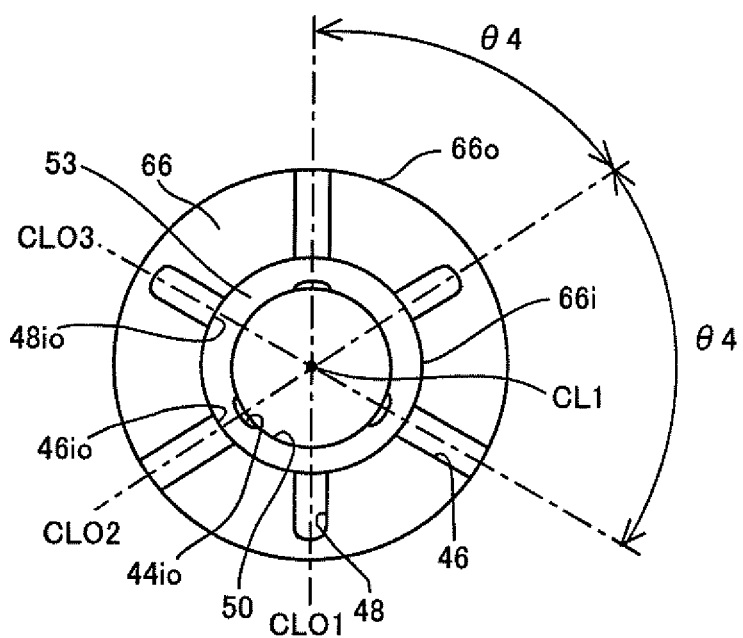
FIG. 8 is a view of a right-side contact surface or a left-side contact surface of the differential casing in a fourth embodiment of the invention, as seen in the direction indicated by arrows A in FIG. 2 or the direction indicated by arrows B in FIG. 2, and the view shows that three second lubrication grooves and three third lubrication grooves are provided in each of the right-side contact surface and the left-side contact surface.

In this fourth embodiment, the pair of circular-shaped contact surfaces 66 of the differential casing 26 are identical with each other in terms of shape that is shown in FIG. 8. That is, a view of the right-side contact surface 66 as seen in the direction indicated by arrows A in FIG. 2 and a view of the left-side contact surface 66 as seen in the direction indicated by arrows B in FIG. 2 are identical with each other. The two contact surfaces 66 are symmetrical with each other, with respect to either a center line which corresponds to the second axis CL2 or a center plane which contains the second axis CL2 and which is perpendicular to the first axis CL1. The three second lubrication grooves 46 are arranged such that the widthwise center line of one of the three second lubrication grooves 46 coincides with the first center line CLO1, that of another one of the three second lubrication grooves 46 coincides with the third center line CLO3 that is angularly distant from the first center line CLO1 by 120° in clockwise direction as seen in FIG. 8, and that of still another one of the three second lubrication grooves 46 coincides with the second center line CLO2 that is angularly distant from the third center line CLO3 by 120° in the clockwise direction. The three third lubrication grooves 48 are arranged such that the widthwise center line of one of the three third lubrication grooves 48 coincides with the second center line CLO2 that is angularly distant from the first center line CLO1 by 60° in the clockwise direction, that of another one of the three third lubrication grooves 48 coincides with the first center line CLO1 that is angularly distant from the second center line CLO2 by 120° in the clockwise direction, and that of still another one of the three third lubrication grooves 48 coincides with the third center line CLO3 that is angularly distant from the first center line CLO1 by 120° in the clockwise direction. Further, the one of the third lubrication grooves 48 whose widthwise center line coincides with the second center line CLO2 is angularly distant from each of two of the second lubrication grooves 46 that are circumferentially adjacent to the third lubrication groove 48, by a predetermined angle θ4 that is 60°. The center of the radially inner opening 46*io* of each of the second lubrication grooves 46 and the center of the side-gear side opening 44*io* of a corresponding one of the first lubrication grooves 46 both lie on a plane containing the first axis CL1 and a corresponding one of the first, second and third center lines CLO1, CLO2, CLO3. Therefore, the lubricant can flow smoothly from each first lubrication groove 44 to the corresponding second lubrication groove 46 via the first and second clearances 54, 55.

In this fourth embodiment, the number of the second lubrication grooves 46 provided in each one of the right-side and left-side contact surfaces 66 of the differential casing 26 and the number of the third lubrication grooves 48 provided in the same contact surface 66 are the same and both an odd number that is three. The radially inner opening 46*io* of each of the second lubrication grooves 46 and the radially inner opening 48*io* of a corresponding one of the third lubrication grooves 48 are opposed to each other in the diametrical direction of a corresponding one of the axle supporting holes 50. Owing to this arrangement, a sufficient amount of lubricant can be retained on the contact surfaces 66 of the differential casing 26 that are in contact with the respective washers 56, and an entirety of each contact surface 66 can be lubricated by a more even amount of lubricant, whereby the wears of the differential casing 26 and the washers 56 can be easily reduced.

There will be described still another embodiment of this invention. The same reference signs as used in the above-described embodiments will be used in the following embodiment, to identify the functionally corresponding elements, and descriptions thereof are not provided.

Fifth Embodiment

In the above-described fourth embodiment, the three second lubrication grooves 46 are arranged such that their respective widthwise center lines coincide with respective straight lines passing through the first axis CL1. In this fifth embodiment, the three second lubrication grooves 46 are arranged such that any one of the fourth, fifth and sixth center lines CLO4, CLO5, CLO6 as their respective widthwise center lines does not coincide with a straight line passing through the first axis CL1, but is distant from a straight line which passes thought the first axis CL1 and is parallel with the center line, by a predetermined distance d2. The fourth, fifth and sixth center lines CLO4, CLO5, CLO6 as their respective widthwise center lines are substantially parallel with the respective first, third and second center lines CLO1, CLO3, CLO2 as the widthwise center lines of the respective third lubrication grooves 48.

FIG. 9 is a view of the left-side contact surface 66 of the differential casing 26 as seen in the direction indicated by arrows B in FIG. 2. In this fifth embodiment, each of the right-side and left-side contact surfaces 66 is provided with three second lubrication grooves 46 and three third lubrication grooves 48 for supplying the lubricant to the washers 56. The second lubrication grooves 46 are arranged such that the center of the radially inner opening 46*io* of each second lubrication grooves 46 and the center of the side-gear side opening 44*io* of the corresponding first lubrication groove 44 both lie on a plane containing the first axis CL1. Therefore, the lubricant can flow smoothly from each first lubrication groove 44 to the corresponding second lubrication groove 46 via the first and second clearances 54, 55. Further, the third lubrication grooves 48 are arranged such that their respective widthwise center lines coincide with the first, second and third center lines CLO1, CLO2, CLO3. The second center line CLO2 is angularly distant from the first center line CLO1 by 60° in clockwise direction as seen in FIG. 9, and the third center line CLO3 is angularly distant from the second center line CLO2 by 60° in the clockwise direction. The widthwise center line of each of the second lubrication grooves 46 is parallel with the widthwise center line of a corresponding one of the third lubrication grooves 48 that is substantially diametrically opposed to the each of the second lubrication grooves 46. The fourth center line CLO4 as the widthwise center line of one of the second lubrication grooves 46, which is parallel with the first center line CLO1, is distant from the first center line CLO1 by a predetermined distance d2. The center of the radially inner opening 46*io* of one of the three second lubrication grooves 46, whose widthwise center line coincides with the fourth center line CLO4, and the center of the side-gear side opening 44*io* of a corresponding one of the three first lubrication grooves 44, both lie on a plane containing the first axis CL1 and the seventh center line CLO7. The fourth center line CLO4 cooperates with the seventh center line CLO7 to define a predetermined angle θ5. Regarding the other two of the three second lubrication grooves 46, too, each of the fifth center line CLO5 and the sixth center line CLOG as their widthwise center lines is distant, by the predetermined distance d2, from a corresponding one of the third center line CLO3 and the second center line CLO2 as widthwise center lines of the corresponding two of the three third lubrication grooves 48.

In this fifth embodiment, as in the above-described first through fourth embodiments, the wears of the differential casing 26 and the washers 56 can be easily reduced. Further, the arrangements of the second lubrication grooves 46 can be modified such that the center of the radially inner opening 46*io* of each of the second lubrication grooves 46 lies on a center line that cooperates with a corresponding one of the center lines CLO1, CLO2, CLO3 as widthwise center lines of the third lubrication grooves 48, by the predetermined angle θ5.

While the embodiments of the present invention have been described above, it is to be understood that the present invention may be embodied otherwise.

In the above-described first through fifth embodiments, the first lubrication grooves 44 communicate with the respective second lubrication grooves 46 via the first and second clearances 54, 55 that cooperate with each other to serve as a connecting passage. However, the connecting passage may be constituted by recesses or grooves provided in the inner circumferential surface of the boss-portion fitting hole 52 and the stepped surface 53 that connects between the inner circumferential surface of the axle supporting hole 50 and the inner circumferential surface of the boss-portion fitting hole 52.

In the above-described first through fifth embodiments, the center of the side-gear side opening 44*io* of each first lubrication groove 44 and the center of the radially inner opening 46*io* of the corresponding second lubrication groove 46 overlap in the radial direction of the axle supporting hole 50. However, the side-gear side opening 44*io* and the radially inner opening 46*io* do not necessarily have to completely overlap with each other, as long as they overlap with each other at least partially in the radial direction.

In the above-described first through third embodiments in which an even number of second lubrication grooves 46 are provided in each of the right-side and left-side contact surfaces 66, the centers of the radially inner openings 46*io* of the respective second lubrication grooves 46 are located symmetrically with respect to the first axis CL1 of the axle supporting hole 50, and the radially inner openings 48*io* of the respective third lubrication grooves 48 are also located symmetrically with respect to the first axis CL1. However, the symmetrical location is not essential. The radially inner openings 46*io* or radially inner openings 48*io* may be substantially diametrically opposed to each other, preferably, diametrically overlap with each other at least partially. In the above-described fourth embodiment in which an odd number of second lubrication grooves 46 and an odd number of third lubrication grooves 48 are provided in each of the contact surfaces 66, the center of the radially inner opening 46*io* of each of the second lubrication grooves 46 and the center of the radially inner opening 48*io* of a corresponding one of the third lubrication grooves 48 are located symmetrically with respect to the first axis CL1 of the axle supporting hole 50. However, the symmetrical location is not essential. The radially inner openings 46*io*, 48*io* may be substantially diametrically opposed to each other, preferably, diametrically overlap with each other at least partially.

In the above-described second, third and fifth embodiments, each of the two or three second lubrication grooves 46 is arranged such that its widthwise center line (coincident with, for example, the third center line and fourth center line) is substantially parallel with the first, second or third center line. However, the parallel arrangement is not essential. For example, in the second and third embodiments, the arrangement of the second lubrication grooves 46 may be modified such that the modified arrangement increases or reduces the predetermined angle θ2 defined between the widthwise centerline of each of the second lubrication grooves 46 and the sixth center line CLE6 that passes through the first axis CL1.

It is to be understood that the embodiments described above are given for illustrative purpose only, and that the present invention may be embodied with various modifications and improvements which may occur to those skilled in the art.

NOMENCLATURE OF ELEMENTS

10: Vehicle differential device
26: Differential casing
32: Side gear
34: Pinion gear
36: Axle
44: First lubrication groove
44*io*: Side-gear side opening of first lubrication groove
46: Second lubrication groove
46*io*: Radially inner opening of second lubrication groove
48: Third lubrication groove
48*io*: Radially inner opening of third lubrication groove
50: Axle supporting hole
54: First clearance (connecting passage)
55: Second clearance (connecting passage)
56: Washer
64: Back surface
66: Contact surface
70: Space

What is claimed is:

1. A differential device for a vehicle, comprising:
a differential casing having a pair of axle supporting holes in which a pair of axles of the vehicle are rotatably supported;
a pinion gear rotatably supported in said differential casing;
a pair of side gears which mesh with said pinion gear and which are connected to the respective axles of the vehicle; and
a pair of washers each of which is interposed between said differential casing and a back surface of a corresponding one of said pair of side gears, and each of which is in contact with a corresponding one of a pair of contact surfaces of said differential casing, wherein
said differential casing defines at least one first lubrication groove, at least one second lubrication groove and at least one third lubrication groove,
each of said at least one first lubrication groove is provided in an inner circumferential surface of a corresponding one of said pair of axle supporting holes, and extends in a direction including a component of an axial direction of said corresponding one of said pair of axle supporting holes,
each of said at least one second lubrication groove and each of said at least one third lubrication groove are provided in a corresponding one of said pair of contact surfaces of said differential casing,
each of said at least one second lubrication groove communicates at one of opposite ends thereof with a corresponding one of said at least one first lubrication groove through a connecting passage, and communicates at the other of the opposite ends thereof with a space located radially outside a corresponding one of said pair of side gears, and each of said at least one third lubrication groove communicates at one of opposite ends thereof with a corresponding one of said at least one first lubrication groove through said connecting passage, and is closed at the other of the opposite ends thereof, without said each of said at least one third lubrication groove being in communication with said space.

2. The differential device according to claim 1, wherein the number of said at least one first lubrication groove provided in said inner circumferential surface of each of said pair of axle supporting holes is equal to the number of said at least one second lubrication groove provided in a corresponding one of said pair of contact surfaces of said differential casing.

3. The differential device according to claim 1, wherein said at least one second lubrication groove provided in each of said pair of contact surfaces of said differential casing consists of a plurality of second lubrication grooves, such that said plurality of second lubrication grooves extend from said connecting passage radially outwardly toward said space, and such that the number of said plurality of second lubrication grooves is an even number, said at least one third lubrication groove provided in said each of said pair of contact surfaces of said differential casing consists of a plurality of third lubrication grooves, such that said plurality of third lubrication grooves extend from said connecting passage radially outwardly toward said space, and such that the number of said plurality of third lubrication grooves is an even number and is equal to the number of said plurality of second lubrication grooves, each of said plurality of second lubrication grooves has a radially inner opening as said one of said opposite ends of said each of said plurality of second lubrication grooves, and each of said plurality of third lubrication grooves has a radially inner opening as said one of said opposite ends of each of said plurality of third lubrication grooves, said radially inner opening of one of said plurality of second lubrication grooves and said radially inner opening of another of said plurality of second lubrication grooves are opposed to each other in a diametrical direction of a corresponding one of said pair of axle supporting holes, and said radially inner opening of one of said plurality of third lubrication grooves and said radially inner opening of another of said plurality of third lubrication grooves are opposed to each other in said diametrical direction.

4. The differential device according to claim 1, wherein said at least one second lubrication groove and said at least one third lubrication groove extend from said connecting passage radially outwardly toward said space, the number of said at least one second lubrication groove provided in each of said pair of contact surfaces of said differential casing is an odd number, the number of said at least one third lubrication groove provided in said each of said pair of contact surfaces of said differential casing is an odd number, and is equal to the number of said at least one second lubrication groove, each of said at least one second lubrication groove has a radially inner opening as said one of said opposite ends of said each of said at least one second lubrication groove, and each of said at least one third lubrication groove has a radially inner opening as said one of said opposite ends of each of said at least one third lubrication groove, and said radially inner opening of each of said at least one second lubrication groove and said radially inner opening of a corresponding one of said third lubrication groove are opposed to each other in a diametrical direction of a corresponding one of said pair of axle supporting holes.

5. The differential device according to claim 1, wherein each of said at least one second lubrication groove extends from said connecting passage radially outwardly toward said space, and has a radially inner opening as said one of said opposite ends of said each of said at least one second lubrication groove, each of said at least one first lubrication groove, which is provided in said inner circumferential surface of said corresponding one of said pair of axle supporting holes, has an opening, such that said each of said at least one first lubrication groove communicates at said opening thereof with said connecting passage, and said opening of each of said at least one first lubrication groove overlaps with said radially inner opening of a corresponding one of said at least one second lubrication groove in a radial direction of a corresponding one of said pair of axle supporting holes.

6. The differential device according to claim 1, wherein each of said at least one first lubrication groove is a helical groove extending in a helical direction as said direction including said component of said axial direction.

7. The differential device according to claim 1, wherein said at least one first lubrication groove, which is provided in said inner circumferential surface of each of said pair of axle supporting holes, consists of a plurality of first lubrication grooves, said at least one second lubrication groove, which is provided in a corresponding one of said pair of contact surfaces of said differential casing, consists of a plurality of second lubrication grooves, said at least one third lubrication groove, which is provided in said corresponding one of said pair of contact surfaces of said differential casing, consists of a plurality of third lubrication grooves, and said plurality of first lubrication grooves, said plurality of second lubrication grooves and said plurality of third lubrication grooves communicate with one another through said connecting passage.

* * * * *